US010243977B1

(12) United States Patent
Govindarajan et al.

(10) Patent No.: US 10,243,977 B1
(45) Date of Patent: Mar. 26, 2019

(54) AUTOMATICALLY DETECTING A MALICIOUS FILE USING NAME MANGLING STRINGS

(71) Applicant: SYMANTEC CORPORATION, Mountain VIew, CA (US)

(72) Inventors: Srinivasan Govindarajan, Thiruvallur (IN); Yuvaraj M, Chennai (IN); Swapan Kumar Ghosh, Paschim Medinipur (IN)

(73) Assignee: SYMANTEC CORPORATION, Mountain View, CA (US)

( * ) Notice: Subject to any disclaimer, the term of this patent is extended or adjusted under 35 U.S.C. 154(b) by 155 days.

(21) Appl. No.: 15/629,397

(22) Filed: Jun. 21, 2017

(51) Int. Cl.
  *G06F 21/00* (2013.01)
  *H04L 29/06* (2006.01)
  *H04L 9/06* (2006.01)

(52) U.S. Cl.
  CPC ........ *H04L 63/1416* (2013.01); *H04L 9/0643* (2013.01)

(58) Field of Classification Search
  CPC .................................................. H04L 63/1416
  USPC ......................................................... 726/23
  See application file for complete search history.

(56) References Cited

U.S. PATENT DOCUMENTS

| 8,015,491 B2* | 9/2011 | Shaver | G06F 17/3089 715/716 |
| 9,152,641 B2* | 10/2015 | Halpern, III | G06F 17/30091 |
| 2009/0158432 A1* | 6/2009 | Zheng | G06F 21/562 726/24 |

* cited by examiner

Primary Examiner — Longbit Chai
(74) Attorney, Agent, or Firm — Maschoff Brennan (57) ABSTRACT

Automatically detecting a malicious file using name mangling strings. In one embodiment, a method may include (a) identifying a file, (b) identifying name mangling strings in the file, (c) concatenating the name mangling strings together, (d) hashing the concatenated name mangling strings to generate a signature for the file, (e) clustering the file with other files with matching signatures into a cluster, (f) determining that any of the files in the cluster is malicious, (g) adding the signature to a list of signatures of files known to be malicious, (f) identifying a network device file stored on a network device, (g) repeating (b)-(d) on the network device file, (h) determining that the signature for the network device file matches any signature in the list of signatures of files known to be malicious, and (i) performing a security action on the malicious file on the network device.

20 Claims, 6 Drawing Sheets

AUTOMATICALLY DETECTING A MALICIOUS FILE USING NAME MANGLING STRINGS

BACKGROUND

Some network security applications function to detect malicious files stored on network devices before the malicious files can be executed or otherwise employed in damaging the network or network devices. Examples of malicious files include files that contain viruses or malware.

For example, a network security application may attempt to identify a malicious file by comparing a suspicious file that is suspected of being malicious to a list of files known to be malicious. If the suspicious file matches any of the files in the list of files known to be malicious, the network security application may identify the suspicious file as a malicious file. However, purveyors of malicious files have attempted to avoid detection of their malicious files by causing variations of their malicious files to have minor differences which cause the malicious files to not match up exactly with the files in a list of malicious files. The proliferation of these variations of malicious files has rendered many network security applications incapable of accurately detecting many malicious files, which leaves network devices vulnerable to undetected malicious files.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for automatically detecting a malicious file using name mangling strings may be performed, at least in part, by a computing device including at least one processor. The method may include (a) identifying a file, (b) identifying name mangling strings in the file, (c) concatenating the name mangling strings together, (d) hashing the concatenated name mangling strings to generate a signature for the file, (e) clustering the file with other files with matching signatures into a cluster, (f) determining that one of the files in the cluster is malicious, (g) adding the signature to a list of signatures of files known to be malicious, (f) identifying a network device file stored on a network device, (g) repeating (b)-(d) on the network device file, (h) determining that the signature for the network device file matches any signature in the list of signatures of files known to be malicious and that the network device file is therefore a malicious file, and (i) performing a security action on the malicious file on the network device to protect the network device.

In some embodiments, the file and the network device file may be Portable Executable (PE) files. Also, in some embodiments, (b) may include identifying name mangling strings in a Data section of the PE file. Further, in some embodiments, (c) may include concatenating the name mangling strings together with one or more delimiter characters between each of the name mangling strings. Also, in some embodiments, (c) may include concatenating the name mangling strings together in a sequence that matches a sequence that the name mangling strings are listed in a Data section of a PE file. Further, in some embodiments, (d) may include performing a Secure Hash Algorithm-256 (SHA-256) algorithm on the concatenated name mangling strings to generate the signature for the file. Also, in some embodiments, (i) may include quarantining the malicious file on, or removing the malicious file from, the network device to prevent the malicious file from executing on the network device.

Further, in some embodiments, one or more non-transitory computer-readable media may include one or more computer-readable instructions that, when executed by one or more processors, cause the one or more processors to perform a method for automatically detecting a malicious file using name mangling strings.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Some embodiments in this disclosure relate to automatically detecting a malicious file using name mangling strings.

Some network security applications function to detect malicious files stored on network devices, such as files that include viruses or malware, before the malicious files can be executed or otherwise employed in damaging the network devices. For example, a network security application may attempt to identify malicious files by comparing a file signature of a suspicious file that is suspected of being malicious to a list of file signatures of files known to be malicious. If the suspicious file's signature matches any of the file signatures in the list of malicious files, the network security application may identify the suspicious file as a malicious file. However, purveyors of malicious files have attempted to avoid detection of their malicious files by causing variations of their malicious files to have minor differences which cause the file signatures of the malicious files to not match up exactly with any of the file signatures in lists of malicious files. The proliferation of these variations of malicious files has rendered many network security applications incapable of detecting many malicious files, which leaves networks and network devices vulnerable to undetected malicious files.

The embodiments disclosed herein may enable automatically detecting a malicious file using name mangling strings. In some embodiments, automatically detecting a malicious file using name mangling strings may include generating a file signature for a file by identifying name mangling strings in the file, concatenating the name mangling strings together, and hashing the concatenated name mangling strings to generate a file signature for the file. These file signatures generated using name mangling strings can be employed in the generation of a list of file signatures of files known to be malicious and in generating a suspicious file's signature.

Even when purveyors of malicious files cause variations of their malicious files to have minor differences, a network security application that detects malicious files using file signatures generated using name mangling strings may be capable of accurately clustering variations of a malicious file together as matching malicious files with few or no false positives in the cluster. This may render the network security application capable of more accurately detecting malicious files, which leaves networks and network devices less vulnerable to undetected malicious files.

Figure 1:
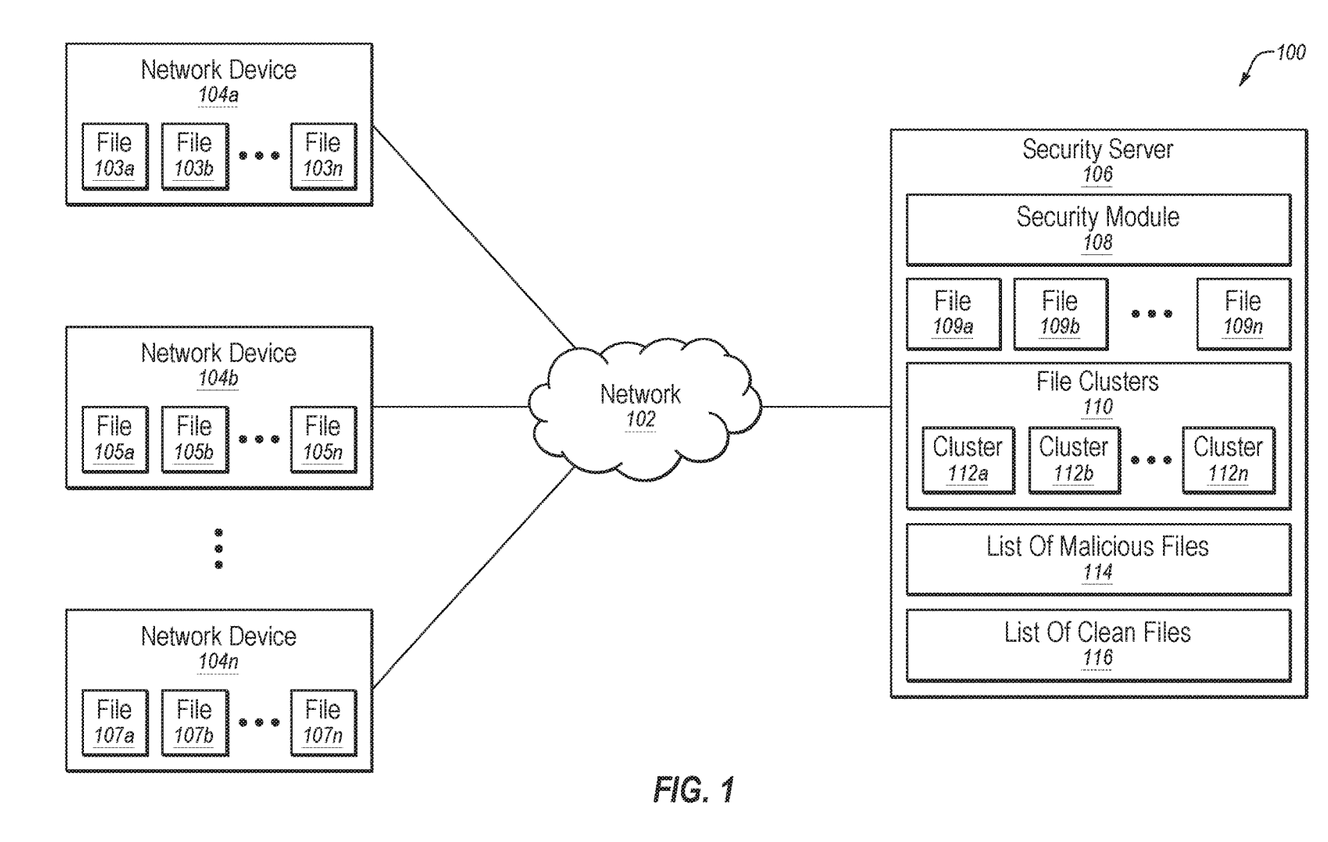
FIG. 1 illustrates an example system configured for automatically detecting a malicious file using name mangling strings.

Turning to the figures, FIG. 1 illustrates an example system 100 configured for automatically detecting a malicious file using name mangling strings. The system 100 may include a network 102, network devices 104a-104n, and a security server 106.

In some embodiments, the network 102 may be configured to communicatively couple the network devices 104a-104n to one another as well as to the security server 106. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), or some combination thereof. In some embodiments, the network 102 may also be coupled to, or may include, portions of a telecommunications network, including telephone lines, for sending data in a variety of different communication protocols, such as a cellular network or a Voice over IP (VoIP) network.

Figure 4:
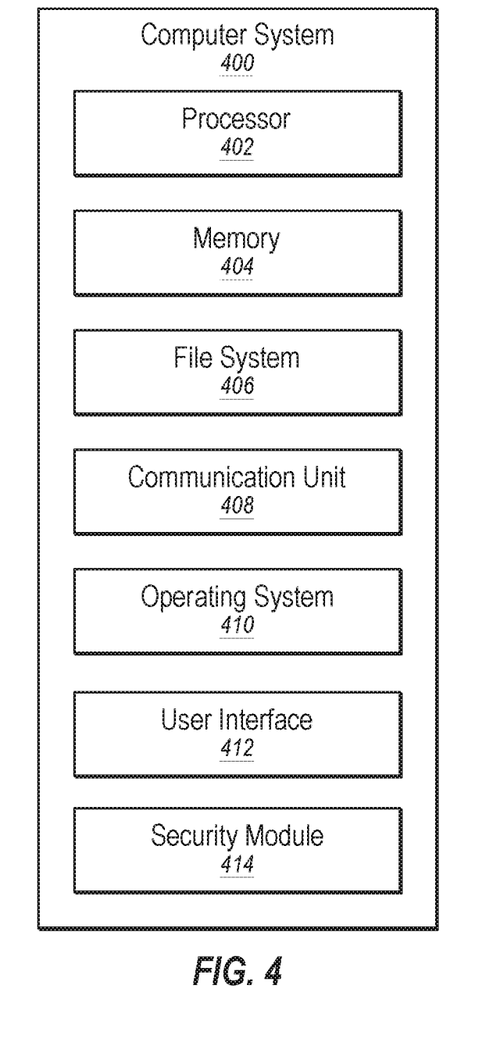
FIG. 4 illustrates an example computer system that may be employed in automatically detecting a malicious file using name mangling strings.

In some embodiments, each of the network devices 104a-104n may be any computer system capable of communicating over the network 102, examples of which are disclosed herein in connection with the computer system 400 of FIG. 4. Each of the network devices 104a, 104b, and 104n may store files 103a-103n, 105a-105n, and 107a-107n, respectively. Any one of these files may be a malicious file. A malicious file may be, but is not limited to, a file that contains one or more of spyware, a virus, a worm, a logic bomb, a trapdoor, a Trojan horse, a Remote Admin Trojan (RAT), malware, mobile malicious code, a malicious font, and a rootkit.

In some embodiments, the security server 106 may be any computer system capable of communicating over the network 102 and capable of monitoring the network devices 104a-104n, examples of which are disclosed herein in connection with the computer system 400 of FIG. 4. In some embodiments, the server may include a security module 108 that may be configured to detect, over the network 102, whether any of the files 103a-103n, 105a-105n, and 107a-107n on the network devices 104a, 104b, and 104n is a malicious file, as disclosed in greater detail in connection with FIGS. 2 and 3A-3C herein. In some embodiments, the security module 108 may include, or have access to, files 109a-109n, file clusters 110 including clusters 112a-112n, a list of malicious files 114, and a list of clean files 116. In some embodiments, the security module 108 may include, or be part of, an Antivirus (AV) application (which may actually protect against forms of malicious files beyond files that only include a virus) or a Security Information and Event Management (SIEM) application.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1.

Figure 2:
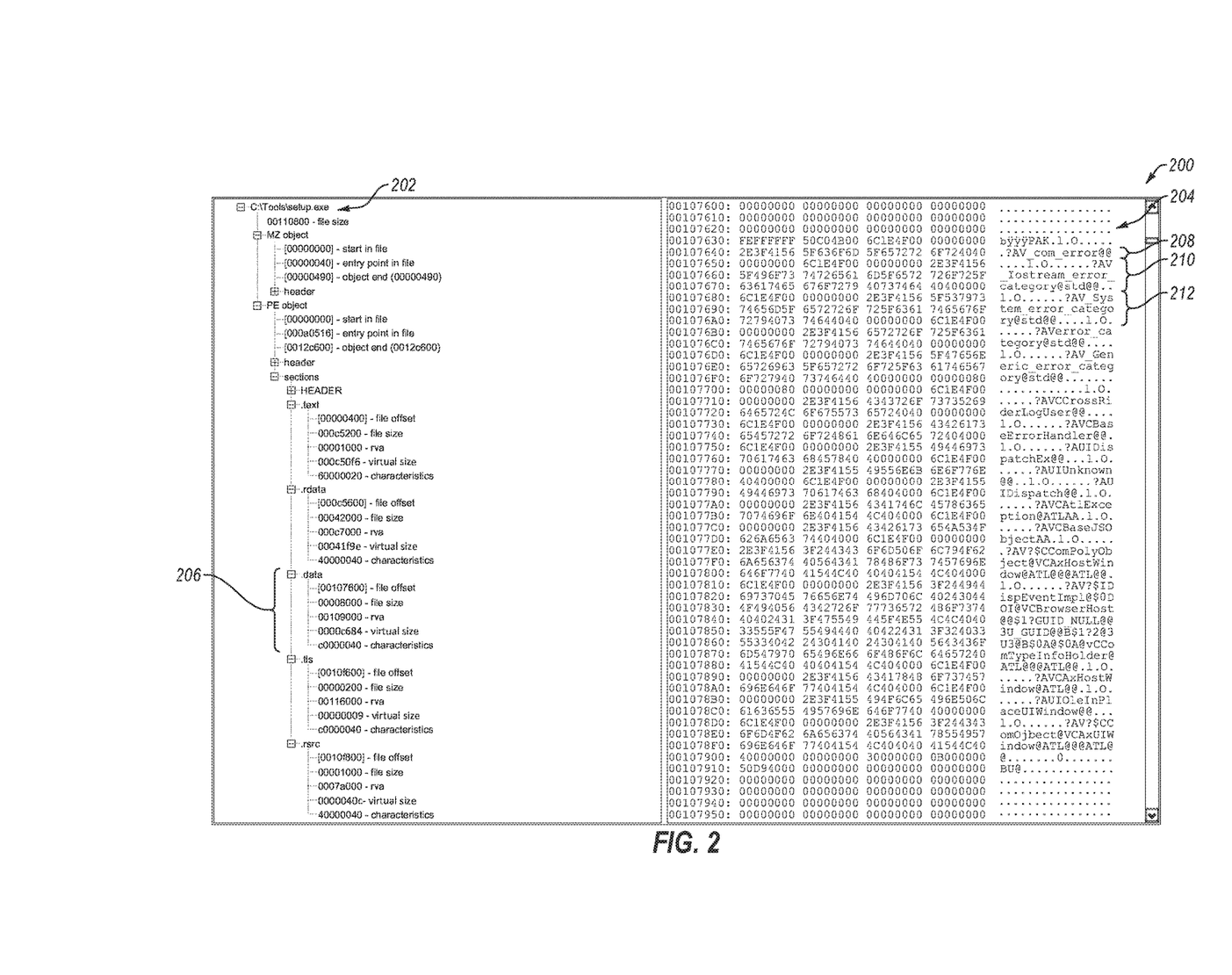
FIG. 2 illustrates a user interface of an application that displays a file including name mangling strings.

FIG. 2 illustrates a user interface 200 of an application that displays a file 202 including name mangling strings. In particular, the file 202 illustrated in the user interface 200 of FIG. 2 may be a file stored on a security server, such as the file 109a stored on the security server 106. Alternatively, the file 202 may be a filed stored on a network device, such as the file 103a stored on the network device 104a of FIG. 1. As disclosed in FIG. 2, the file 202 illustrated in the user interface 200 is named setup.exe and is found in a folder C:\Tools of a network device. In some embodiments, the file 202 may be a Portable Executable (PE) file that contains name mangling strings.

The name mangling strings in the data 204 of the file 202 may function to encode function and variable names of an executable file into unique names so that linkers can separate common names in the language of the executable file. The name mangling strings in the data 204 of the file 202 may be found in the Data section 208 of the file 202. The name mangling strings may be identified by one or more particular delimiter character(s) at the beginning and the end of each name mangling string. For example, the file 202 may include name mangling strings that include a '?' delimiter character at the beginning of the name mangling string and two '@@' characters at the end of the name mangling string, such as the name mangling strings 208, 210, and 212.

The name mangling strings of the file 202 may be employed in the generation of a file signature for the file 202. This file signature may then be compared to a list of file signatures that were similarly generated for files known to be malicious files. If there is a match, the file 202 may be determined to be a malicious file, and the file may be added to a list of malicious files, such as the list of malicious files 114 of FIG. 1, or an appropriate security action may be taken against the file 202, such as removing or quarantining the file 202 to protect a network device on which the file 202 is stored, such as the network device 104a of FIG. 1.

Modifications, additions, or omissions may be made to the example file 202 illustrated in the user interface 200 of FIG. 2 without departing from the scope of the present disclosure. For example, although the file 202 is a Portable Executable (PE) file, it is understood that the file 202 may be any file that includes name mangling strings. Further, the name mangling strings may have a format that is different from the name mangling strings illustrated in FIG. 2.

Figure 3A:
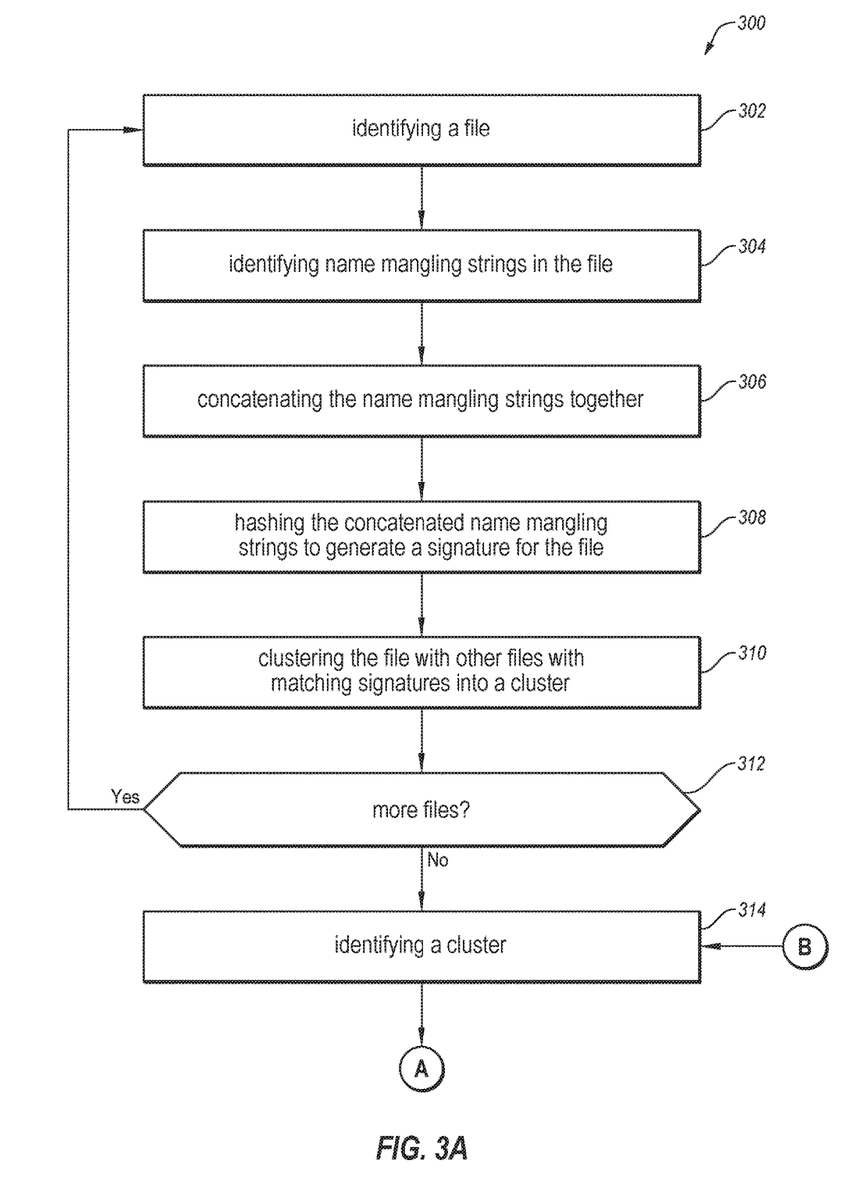
FIGS. 3A-3C are a flowchart of an example method for automatically detecting a malicious file using name mangling strings.
Figure 3B:
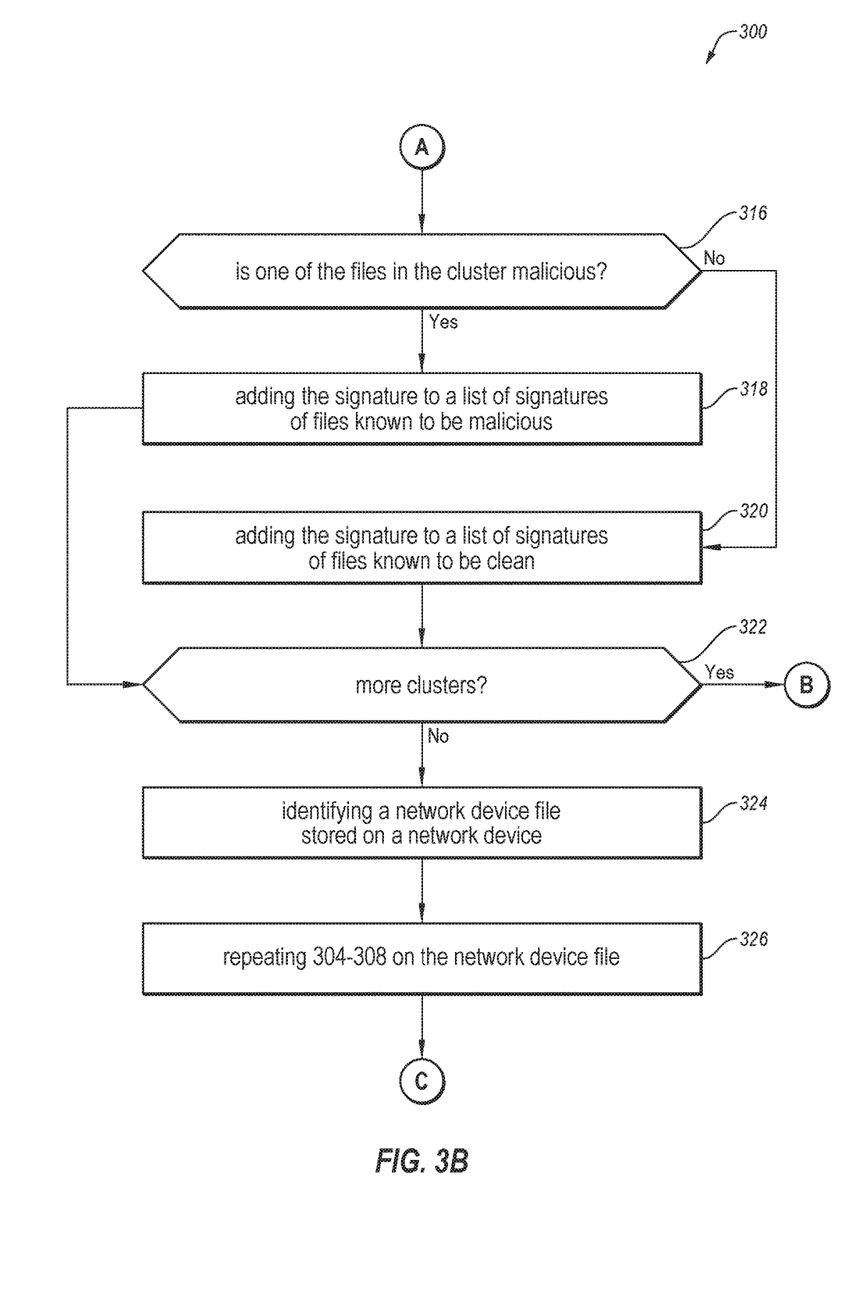
Figure 3C:
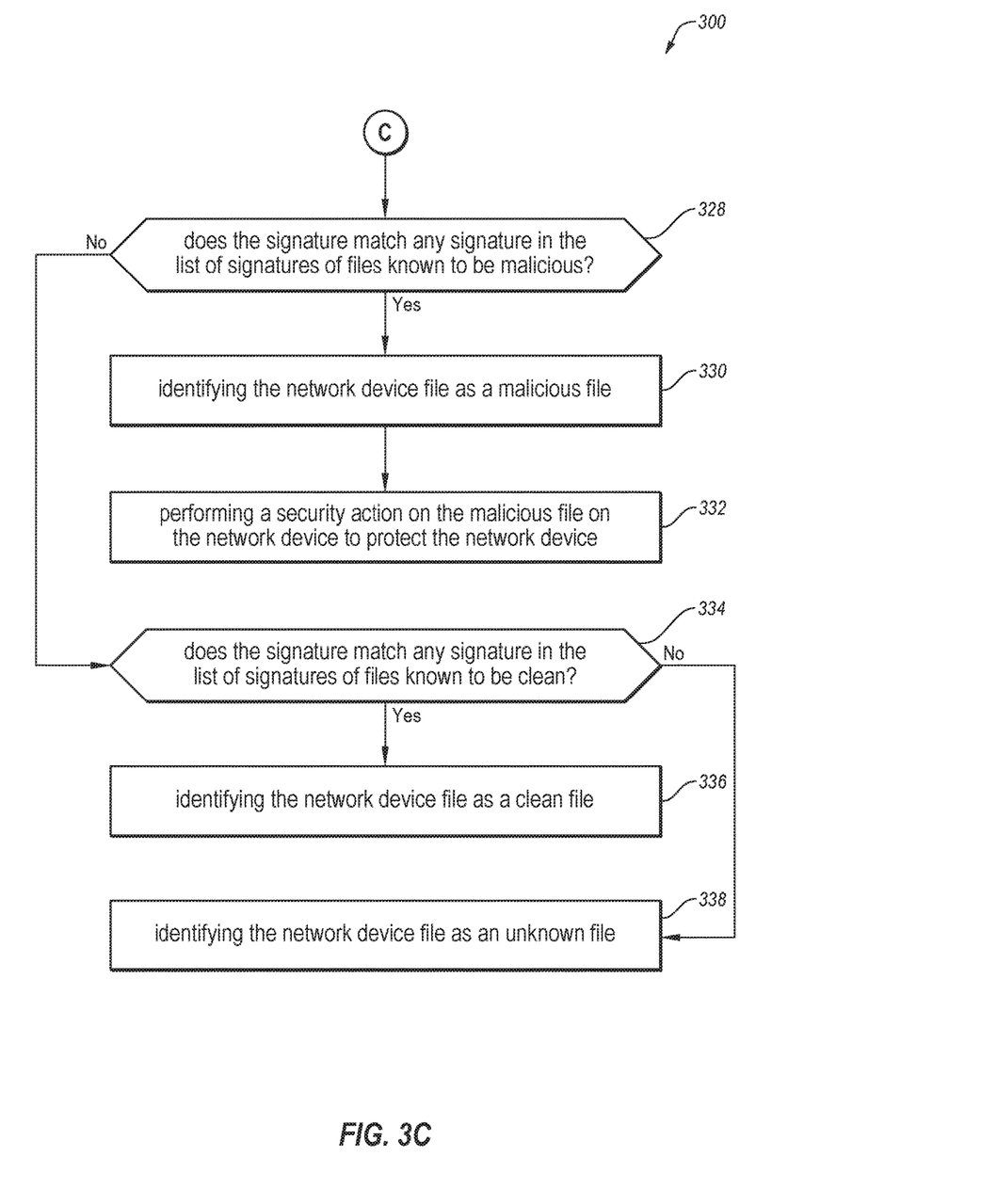

FIGS. 3A-3C are a flowchart of an example method 300 for automatically detecting a malicious file using name mangling strings. The method 300 may be performed, in some embodiments, by a device or system, such as by the security module 108 executing on the security server 106 of FIG. 1. In these and other embodiments, the method 300 may be performed by one or more processors based on one or more computer-readable instructions stored on one or more non-transitory computer-readable media. The method 300 will now be described in connection with FIGS. 1, 2, and 3A-3C.

The method 300 may include, at block 302, identifying a file. In some embodiments, the file identified at block 302 (and the network device file identified at block 324, as discussed below) may be a Portable Executable (PE) file. For example, the security module 108 may identify, at block 302, the file 202, which may be a PE file and which may be the file 109a stored on the security server 106. In this example, the files 109a-109n may be files that are targeted to have file signatures generated and that are targeted to be added to the file clusters 110.

The method 300 may include, at block 304, identifying name mangling strings in the file. In some embodiments, the name mangling strings identified at block 304 may include all name mangling strings in the file or a subset of all the name mangling strings in the file, such as all name mangling strings in a section of the file. For example, the security module 108 may identify, at block 304, name mangling strings 208, 210, and 212 in the Data section 206 of the file 202. In this example, the name mangling strings 208 may also include all other name mangling strings in the Data section 206 of the file 202.

The method 300 may include, at block 306, concatenating the name mangling strings together. In some embodiments, the concatenating at block 306 may include concatenating the name mangling strings together with one or more delimiter characters between each of the name mangling strings. In some embodiments, the concatenating at block 306 may include concatenating the name mangling strings together in a sequence that matches a sequence that the name mangling strings are listed in a Data section of a PE file. For example, the security module 108 may concatenate, at block 306, the name mangling strings 208, 210, and 212 together, as well as all other name mangling strings in the Data section 206 of the PE file 202, with one or more delimiter characters between each of the name mangling strings, and in a sequence that matches a sequence that the name mangling strings are listed in the Data section 206 of the PE file 202.

The method 300 may include, at block 308, hashing the concatenated name mangling strings to generate a signature for the file. In some embodiments, the hashing at block 308 may include performing a Secure Hash Algorithm-256 (SHA-256) algorithm on the concatenated name mangling strings to generate the signature for the file. For example, the security module 108 may perform, at block 308, a SHA-256 algorithm on the concatenated name mangling strings to generate a signature for the file 202.

The method 300 may include, at block 310, clustering the file with other files with matching signatures into a cluster. For example, the security module 108 may cluster, at block 310, the file 202 with other files with matching signatures into a cluster 112a in the file clusters 110 of the security server 106.

The method 300 may include, at decision block 312, determining whether there are more files targeted for having a file signature generated and targeted for being added to a cluster. If so (Yes at decision block 312), the method 300 may return to block 302 to process the next file. If not (No at decision block 312), the method 300 may continue to block 314. For example, the security module 108 may determine, at decision block 312, that the files 109b-109n stored on the security server 106 are still waiting to have a file signature generated and waiting to be added to one of the file clusters 110 (Yes at decision block 312). Therefore, the method 300 may return to block 302 to process the next file 109b. Alternatively, the security module 108 may determine, at decision block 312, that all of the files 109a-109n have already had file signatures generated and have been added to one of the file clusters 110 (No at decision block 312). Therefore, the method 300 may continue to block 314.

The method 300 may include, at block 314, identifying a cluster. For example, the security module 108 may identify, at block 314, the cluster 112a in the file clusters 110.

The method 300 may include, at decision block 316, determining whether one of the files in the cluster is malicious. If so (Yes at decision block 316), the method 300 may include, at block 318, adding the signature to a list of signatures of files known to be malicious. If not (No at decision block 316), the method 300 may include, at block 320, adding the signature to a list of signatures of files known to be clean. For example, the security module 108 may determine, at decision block 316, that the cluster 112a includes a file that is malicious and may, at block 318, add the file signature of the file (which is the same as all the other file signatures in the cluster 112a) to the list of signatures in the list of malicious files 114. Alternatively, the security module 108 may determine, at decision block 316, that the cluster 112a includes a file that is not malicious and may, at block 320, add the file signature of the file (which is the same as all the other file signatures in the cluster 112a) to the list of signatures in the list of clean files 116.

The method 300 may include, at decision block 322, determining whether there are more clusters targeted for being categorized as either malicious or clean. If so (Yes at decision block 322), the method 300 may return to block 314 to categorize the next cluster. If not (No at decision block 322), the method 300 may continue to block 324. For example, the security module 108 may determine, at decision block 322, that the clusters 112b-112n in the file clusters 110 are still waiting to be categorized as either malicious or clean (Yes at decision block 322). Therefore, the method 300 may return to block 314 to categorize the next cluster 112b. Alternatively, the security module 108 may determine, at decision block 322, that all of the clusters 112a-112n in the file clusters 110 have already been categorized as either malicious or clean (No at decision block 322). Therefore, the method 300 may continue to block 324.

The method 300 may include, at block 324, identifying a network device file stored on a network device. For example, the security module 108 may identify, at block 324, the file 103a stored on the network device 104a.

The method 300 may include, at block 326, repeating blocks 304-308 on the network device file. For example, the security module 108 may repeat, at block 326, blocks 304-308 on the file 103a in order to identify, at block 304, name mangling strings in the file 103a, concatenate, at block 306, the name mangling strings together, and hash, at block 308, the concatenated name mangling strings to generate a signature for the file 103a.

The method 300 may include, at decision block 328, determining whether the signature matches any signature in the list of signatures of files known to be malicious. If so (Yes at decision block 328), the method 300 may include, at block 330, identifying the network device file as a malicious file and, at block 332, performing a security action on the malicious file on the network device to protect the network device. If not (No at decision block 328), the method 300 may proceed to decision block 334. In some embodiments, the performing of the security action at block 332 may include quarantining the malicious file on, or removing the malicious file from, the network device to prevent the malicious file from executing on the network device. For example, the security module 108 may determine, at decision block 328, that the signature of the file 103a matches any signature in the list of malicious files 114 and may therefore identify, at block 330, the file 103a stored on the network device 104a as a malicious file and may also perform, at block 332, a security action on the malicious file 103a on the network device 104a to protect the network device 104a from the malicious file 103a, such as quarantining the malicious file 103a on, or removing the malicious file 103a from, the network device 104a to prevent the malicious file 103a from executing on the network device 104a. Alternatively, the security module 108 may determine, at decision block 328, that the signature of the file 103a does not match any signature in the list of malicious files 114. Therefore, the method 300 may continue to decision block 334.

The method 300 may include, at decision block 334, determining whether the signature matches any signature in the list of signatures of files known to be clean. If so (Yes at decision block 334), the method 300 may include, at block 336, identifying the network device file as a clean file. If not (No at decision block 334), the method 300 may include, at block 338, identifying the network device file as an unknown file. For example, the security module 108 may determine, at decision block 334, that the signature of the file 103a matches any signature in the list of clean files 116 and may therefore identify, at block 336, the file 103a stored on the network device 104a as a clean file. Alternatively, the security module 108 may determine, at decision block 334, that the signature of the file 103a does not match any signature in the list of clean files 116 and may therefore identify, at block 338, the file 103a as an unknown file.

In some embodiments, even when purveyors of malicious files cause variations of their malicious files to have minor differences, the method 300 may be capable of more accurately clustering variations of a malicious file together as matching malicious files with few or no false positives in the cluster. This renders the method 300 capable of more accurately detecting malicious files, which leaves networks and network devices less vulnerable to undetected malicious files.

Although the blocks of the method 300 are illustrated in FIGS. 3A-3C as discrete blocks, various blocks may be divided into additional blocks, combined into fewer blocks, reordered, expanded, or eliminated, depending on the desired implementation. For example, in some embodiments, blocks 302-312 may be performed without performing blocks 314-338, or blocks 314-322 may be performed without performing blocks 302-312 and 324-338, or blocks 324-338 may be performed without performing blocks 302-322. Also, in some embodiments, block 332 may be eliminated or may be performed by a network administrator or other entity that is different from the entity performing the other blocks of the method 300. Further, in some embodiments, blocks 302-312, 314-322, and 324-338 may be performed in parallel with each other.

Further, it is understood that the method 300 may improve the functioning of a network environment. For example, the functioning of the security server 106 or any of the network devices 104a-104n of FIG. 1 may itself be improved by the method 300. For example, any of these computer systems may be improved by automatically detecting a malicious file stored on the computer systems using name mangling strings so that the malicious file may be removed or quarantined to prevent the malicious file from damaging the computer system. The method 300 may thus result in more accurate detection of malicious files than conventional detection methods that use conventional file signatures, which leaves networks and network devices less vulnerable to undetected malicious files.

Also, the method 300 may improve the technical field of detecting malicious files and securing network devices against malicious files. Employing name mangling strings in the generation of more accurate file signatures, and then employing the more accurate file signatures for detecting malicious files, is an improvement over conventional attempts at detecting malicious files using conventional file signatures.

FIG. 4 illustrates an example computer system 400 that may be employed in automatically detecting a malicious file using name mangling strings. In some embodiments, the computer system 400 may be part of any of the systems or devices described in this disclosure. For example, the computer system 400 may be part of any of the network devices or the security server devices of FIGS. 1 and 2.

The computer system 400 may include a processor 402, a memory 404, a file system 406, a communication unit 408, an operating system 410, a user interface 412, and a security module 414, which all may be communicatively coupled. In some embodiments, the computer system may be, for example, a desktop computer, a client computer, a server computer, a mobile phone, a laptop computer, a smartphone, a smartwatch, a tablet computer, a portable music player, or any other computer system.

Generally, the processor 402 may include any suitable special-purpose or general-purpose computer, computing entity, or processing device including various computer hardware or software modules and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 402 may interpret and/or execute program instructions and/or process data stored in the memory 404 and/or the file system 406. In some embodiments, the processor 402 may fetch program instructions from the file system 406 and load the program instructions into the memory 404. After the program instructions are loaded into the memory 404, the processor 402 may execute the program instructions. In some embodiments, the instructions may include the processor 402 performing one or more blocks of the method 300 of FIGS. 3A-3C.

The memory 404 and the file system 406 may include computer-readable storage media for carrying or having stored thereon computer-executable instructions or data structures. Such computer-readable storage media may be any available non-transitory media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more blocks of the method 300 of FIGS. 3A-3C. These computer-executable instructions may be included, for example, in the operating system 410, in one or more applications, such as the security module 414, or in some combination thereof.

The communication unit 408 may include any component, device, system, or combination thereof configured to transmit or receive information over a network, such as the network 102 of FIG. 1. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 408 may permit data to be exchanged with a network and/or any other devices or systems, such as those described in the present disclosure.

The operating system 410 may be configured to manage hardware and software resources of the computer system 400 and configured to provide common services for the computer system 400.

The user interface 412 may include any device configured to allow a user to interface with the computer system 400. For example, the user interface 412 may include a display, such as an LCD, LED, or other display, that is configured to present video, text, application user interfaces, and other data as directed by the processor 402. The user interface 412 may further include a mouse, a track pad, a keyboard, a touchscreen, volume controls, other buttons, a speaker, a microphone, a camera, any peripheral device, or other input or output device. The user interface 412 may receive input from a user and provide the input to the processor 402. Similarly, the user interface 412 may present output to a user.

The security module 414 may be one or more computer-readable instructions stored on one or more non-transitory computer-readable media, such as the memory 404 or the file system 406, that, when executed by the processor 402, is configured to perform one or more blocks of the method 300 of FIGS. 3A-3C. In some embodiments, the security module 414 may be part of the operating system 410 or may be part of an application of the computer system 400, or may be some combination thereof. In some embodiments, the security module 414 may function as the security module 108 of FIGS. 1 and 2.

Modifications, additions, or omissions may be made to the computer system 400 without departing from the scope of the present disclosure. For example, although each is illustrated as a single component in FIG. 4, any of the components 402-414 of the computer system 400 may include multiple similar components that function collectively and are communicatively coupled. Further, although illustrated as a single computer system, it is understood that the computer system 400 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 402 of FIG. 4) including various computer hardware or software modules, as discussed in greater detail below. Further, as indicated above, embodiments described herein may be implemented using computer-readable media (e.g., the memory 404 or file system 406 of FIG. 4) for carrying or having computer-executable instructions or data structures stored thereon.

In some embodiments, the different components and modules described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for automatically detecting a malicious file using name mangling strings, at least a portion of the method being performed by a computing device comprising at least one hardware processor, the method comprising:
   (a) identifying a file;
   (b) identifying name mangling strings in the file;
   (c) concatenating the name mangling strings together;
   (d) hashing the concatenated name mangling strings to generate a signature for the file;
   (e) clustering the file together with other files having signatures that match the signature of the file with the name mangling strings into a cluster;
   (f) determining that one of the files in the cluster is malicious;
   (g) adding the signature to a list of signatures of files known to be malicious;
   (h) identifying a network device file stored on a network device;
   (i) repeating (b)-(d) on the network device file;
   (j) determining that a signature for the network device file matches any signature in the list of signatures of files known to be malicious and that the network device file is therefore a malicious file; and
   (k) performing a security action on the malicious file on the network device to protect the network device.

2. The method of claim 1, wherein the file and the network device file are Portable Executable (PE) files.

3. The method of claim 2, wherein (b) comprises identifying name mangling strings in a Data section of the PE file.

4. The method of claim 3, wherein (c) comprises concatenating the name mangling strings together with one or more delimiter characters between each of the name mangling strings.

5. The method of claim 4, wherein (c) further comprises concatenating the name mangling strings together in a sequence that matches a sequence that the name mangling strings are listed in the Data section of the PE file.

6. The method of claim 4, wherein (d) comprises performing a Secure Hash Algorithm-256 (SHA-256) algorithm on the concatenated name mangling strings to generate the signature for the PE file.

7. The method of claim 1, wherein (k) comprises quarantining the malicious file on, or removing the malicious file from, the network device to prevent the malicious file from executing on the network device.

8. A computer-implemented method for automatically detecting a malicious file using name mangling strings, at least a portion of the method being performed by a computing device comprising at least one hardware processor, the method comprising:
   (a) identifying a Portable Executable (PE) file;
   (b) identifying name mangling strings in a Data section of the PE file;
   (c) concatenating the name mangling strings together;
   (d) hashing the concatenated name mangling strings to generate a signature for the PE file;
   (e) clustering the PE file together with other PE files having signatures that match the signature of the PE file with the name mangling strings into a cluster;
   (f) determining that any of the PE files in the cluster is malicious;
   (g) adding the signature to a list of signatures of PE files known to be malicious;
   (h) identifying a network device PE file stored on a network device;
   (i) repeating (b)-(d) on the network device PE file;
   (j) determining that a signature for the network device PE file matches any signature in the list of signatures of PE files known to be malicious and that the network device PE file is therefore a malicious PE file; and
   (k) performing a security action on the malicious PE file on the network device to protect the network device.

9. The method of claim 8, (b) comprises identifying all of the name mangling strings in the Data section of the PE file.

10. The method of claim 9, wherein (c) comprises concatenating the name mangling strings together with one or more delimiter characters between each of the name mangling strings.

11. The method of claim 10, wherein (c) further comprises concatenating the name mangling strings together in a sequence that matches a sequence that the name mangling strings are listed in the Data section of the PE file.

12. The method of claim 11, wherein (d) comprising performing a Secure Hash Algorithm-256 (SHA-256) algorithm on the concatenated name mangling strings to generate the signature for the PE file.

13. The method of claim 8, wherein (k) comprises quarantining the malicious PE file on, or removing the malicious PE file from, the network device to prevent the malicious PE file from executing on the network device.

14. One or more non-transitory computer-readable storage media comprising one or more computer-readable instructions that, when executed by one or more hardware processors of one or more computing devices, cause the one or more computing devices to perform a method for automatically detecting a malicious file using name mangling strings, the method comprising:
   (a) identifying a file;
   (b) identifying name mangling strings in the file;
   (c) concatenating the name mangling strings together;
   (d) hashing the concatenated name mangling strings to generate a signature for the file;
   (e) clustering the file together with other files having signatures that match the signature of the file with the name mangling strings into a cluster;
   (f) determining that any of the files in the cluster is malicious;
   (g) adding the signature to a list of signatures of files known to be malicious;
   (h) identifying a network device file stored on a network device;
   (i) repeating (b)-(d) on the network device file;

(j) determining that a signature for the network device file matches any signature in the list of signatures of files known to be malicious and that the network device file is therefore a malicious file; and (k) performing a security action on the malicious file on the network device to protect the network device.

15. The one or more non-transitory computer-readable storage media of claim 14, wherein the file and the network device file are Portable Executable (PE) files.

16. The one or more non-transitory computer-readable storage media of claim 15, wherein (b) comprises identifying name mangling strings in a Data section of the PE file.

17. The one or more non-transitory computer-readable storage media of claim 16, wherein (c) comprises concatenating the name mangling strings together with one or more delimiter characters between each of the name mangling strings.

18. The one or more non-transitory computer-readable storage media of claim 17, wherein (c) further comprises concatenating the name mangling strings together in a sequence that matches a sequence that the name mangling strings are listed in the Data section of the PE file.

19. The one or more non-transitory computer-readable storage media of claim 18, wherein (d) comprises performing a Secure Hash Algorithm-256 (SHA-256) algorithm on the concatenated name mangling strings to generate the signature for the PE file.

20. The one or more non-transitory computer-readable storage media of claim 14, wherein (k) comprises quarantining the malicious file on, or removing the malicious file from, the network device to prevent the malicious file from executing on the network device.

* * * * *